US008743097B2

(12) United States Patent
Shang

(10) Patent No.: US 8,743,097 B2
(45) Date of Patent: Jun. 3, 2014

(54) LIQUID CRYSTAL DISPLAY

(75) Inventor: Guangliang Shang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 171 days.

(21) Appl. No.: 13/275,769

(22) Filed: Oct. 18, 2011

(65) Prior Publication Data

US 2012/0092241 A1 Apr. 19, 2012

(30) Foreign Application Priority Data

Oct. 19, 2010 (CN) .......................... 2010 1 0518930

(51) Int. Cl.
*G06F 3/041* (2006.01)

(52) U.S. Cl.
USPC ................................ 345/206; 345/88; 349/37

(58) Field of Classification Search
USPC .................................................. 345/173–179
See application file for complete search history.

(56) References Cited

U.S. PATENT DOCUMENTS 8,023,076 B2 * 9/2011 Yoon ............................ 349/114
2004/0115989 A1 * 6/2004 Matsueda et al. ............ 439/577
2005/0104834 A1 5/2005 Tsuchihashi
2005/0275610 A1 * 12/2005 Roh et al. ........................ 345/88
2008/0018815 A1 * 1/2008 Choi et al. ...................... 349/37
2008/0024709 A1 * 1/2008 Moon .......................... 349/139
2009/0262061 A1 10/2009 Chung et al.
2010/0045883 A1 * 2/2010 Kim et al. ....................... 349/37
2010/0156947 A1 6/2010 Moon et al.
2010/0295830 A1 * 11/2010 Chen ............................ 345/206
2011/0075062 A1 * 3/2011 He et al. ......................... 349/42

FOREIGN PATENT DOCUMENTS

CN 1614678 A 5/2005
CN 101261414 A 9/2008
CN 101458429 A 6/2009
CN 101763837 A 6/2010
KR 20040107672 A 12/2004
KR 20100033893 A 3/2010
KR 20100073544 A 7/2010

OTHER PUBLICATIONS

KIPO Notice of Allowance Appln. 10-2011-0107033 dated Oct. 23, 2012.
First Chinese Office Action dated Jul. 30, 2013; Appln. No. 201010518930.8.
Second Chinese Office Action dated Mar. 21, 2014; Appln. No, 201010518930.8.

* cited by examiner

*Primary Examiner* — Van Chow
(74) *Attorney, Agent, or Firm* — Ladas & Parry LLP

(57) ABSTRACT

A liquid crystal display comprising an array substrate formed with gate lines, data lines and pixel electrodes. Odd rows of pixel electrodes in the same column are connected with one of data lines at two sides of the column, even rows of pixel electrodes are connected with the other one of the data lines; pixel electrodes in the same row are controlled by one of the two gate lines at two sides of the row of pixel electrodes, pixel electrodes controlled by each gate line are located in the same row; there are two gate lines between two adjacent rows of pixel electrodes; two adjacent pixel electrodes in the same row between two adjacent data lines are controlled by one of the two gate lines at two sides of the row of pixel electrodes, and they are connected with one of the two adjacent data lines.

7 Claims, 6 Drawing Sheets

LIQUID CRYSTAL DISPLAY

TECHNICAL FIELD

The present disclosure relates to a technology of liquid crystal display (LCD), and in particular, relates to a LCD.

RELATED ART

FIG. 1 shows a schematic structure of an array substrate of a LCD in the related art, in which the array substrate includes gate lines, data lines and pixel electrodes 1. A part of the array substrate is shown in FIG. 1, and the structure of the part not shown is similar to that of the part shown. The gate lines shown in FIG. 1 are denoted with $G_i$, $G_{i+1}$, $G_{i+2}$, $G_{i+3}$, $G_{i+4}$, $G_{i+5}$, $G_{i+6}$, and $G_{i+7}$, respectively, and the data lines shown in FIG. 1 are denoted with $D_j$, $D_{j+1}$, $D_{j+2}$, $D_{j+3}$, $D_{j+4}$, and $D_{j+5}$, respectively.

In the structure shown in FIG. 1, two adjacent columns of pixel electrodes are input with data signals by the same data line. In the same row, two pixel electrodes 1 connected with the same data line are each controlled by one of the two gate lines at the two sides of the row of pixel electrodes 1. By the array substrate with such a structure, it is possible for a LCD to obtain a good optical uniformity. As shown in FIG. 1, in the same row, two columns of pixel electrodes 1 are grouped into one group, and the polarity of signals on the two pixel electrodes 1 in each group is the same, whereas, the polarity of signals on pixel electrodes 1 in two adjacent groups is opposite. In the same column, the polarity of signals on any two adjacent pixel electrodes is opposite.

The polarity refers to whether a voltage difference between a voltage applied on pixel electrodes of a LCD and a voltage applied on a common electrode is positive polarity (also called + polarity in the art) or negative polarity (also called − polarity in the art). Liquid crystal molecules are driven by a voltage difference between the voltage of pixel electrodes and the voltage of the common electrode, and the twist direction of liquid crystal molecules is different with the different polarity of the voltage difference, thus allowing the aging of liquid crystal molecules to be avoided. Regularly, when the voltage on pixel electrodes is higher than that on the common electrode, the polarity of data signals input to the pixel electrodes is "+" (positive), and when the voltage on pixel electrodes is lower than that on the common electrode, the polarity of data signals input to the pixel electrodes is "−" (negative).

FIG. 2 is a schematic diagram of driving signals of the array substrate shown in FIG. 1, in which signals input by respective gate lines are denoted with $GL_i$, $GL_{i+1}$, $GL_{i+2}$, $GL_{i+3}$, $GL_{i+4}$, $GL_{i+5}$, $GL_{i+6}$, and $GL_{i+7}$, signals input by the common electrode are denoted with Vcom, signals output by odd data lines are denoted with DATA_ODD, signals output by even data lines are denoted with DATA_EVEN, and DATA_ODD and DATA_EVEN are used to represent the polarity of signals on data lines.

In the structure shown in FIG. 1, in order to obtain a good optical uniformity, in each frame, the polarity of signals on data lines is required to change constantly. For example, when a high level is output by gate line $G_i$, that is, when gate line $G_i$ is turned on, the data signals are input on the pixel electrodes in odd columns of the row m, the polarity of the data signals on odd data lines is "+", and the polarity of the data signals on even data lines is "−". When a high level is output by gate line $G_{i+1}$, that is, when gate line $G_{i+1}$ is turned on, the data signals are input on the pixel electrodes in even columns of the row m, and in order to realize the polarity pattern of signals on pixel electrodes as shown in FIG. 1, it is needed to change the polarity of the data signals on odd data lines to "−", and change the polarity of the data signals on even data lines to "+". When a high level is output by gate line $G_{1+2}$, the data signals are input on the pixel electrodes in odd columns of the row m+1, and in order to realize the polarity pattern of signals on pixel electrodes as shown in FIG. 1, the polarity of the data signals on respective data lines remains unchanged. When a high level is output by gate line $G_{i+3}$, the data signals are input on the pixel electrodes in even columns of the row m+1, and in order to realize the polarity pattern of signals on pixel electrodes as shown in FIG. 1, the polarity of the data signals on respective data lines is needed to be inverted.

For such LCD as shown in FIG. 1, if a good optical uniformity is required, the polarity of data signals on each data line needs to change constantly, and frequent change of the polarity of data signals leads to large power consumption. For example, it needs much more power to change a voltage of a data signal from −6 V to +9 V than to change a voltage of a data signal from +6 V to +9 V.

SUMMARY OF THE DISCLOSURE

The disclosure provides a LCD to solve the problem of large power consumption of the LCD in the prior art.

The disclosure provides a LCD, wherein gate lines, data lines, and pixel electrodes are formed on an array substrate; the odd rows of pixel electrodes in the same column are inputted with data signals by one of the data lines at the two sides of the column, and the even rows of pixel electrodes in the same column are inputted with data signals by the other one of the data lines at the two sides of the column; the pixel electrodes in the same row are respectively controlled by one of the two gate lines at the two sides of the row of pixel electrodes, the pixel electrodes controlled by each gate line are located in the same row; there are two gate lines between two adjacent rows of pixel electrodes; two adjacent pixel electrodes in the same row between two adjacent data lines are respectively controlled by one of the two gate lines at the two sides of the row of pixel electrodes, and are respectively inputted with data signals by one of the two adjacent data lines.

The embodiments of the disclosure also provide a LCD comprising an array substrate on which formed gate lines, data lines and pixel electrodes; among the same column of pixel electrodes, two adjacent pixel electrodes are grouped into one group, the pixel electrodes in the odd groups are input with data signals by one of the data lines at two sides of the column of pixel electrodes, and the pixel electrodes in the even groups are input with data signals by the other one of the data lines at two sides of the column of pixel electrodes; the pixel electrodes in the same row are respectively controlled by one of the two gate lines at the two sides of the row of pixel electrodes, the pixel electrodes controlled by each gate line are located in the same row; there are two gate lines between two adjacent rows of pixel electrodes; two adjacent pixel electrodes in the same row between two adjacent data lines are respectively controlled by one of the two gate lines at the two sides of the row of pixel electrodes, and are respectively inputted with data signals by one of the two adjacent data lines.

According to the LCD provided by each embodiment of the disclosure, odd rows of pixel electrodes in the same column are controlled by one of the data lines at the two sides of the column, and even rows of pixel electrodes in the same column are controlled by the other one of the data lines at the two sides of the column; and two adjacent pixel electrodes in the same row between two adjacent data lines are respectively controlled by one of the two gate lines at the two sides of the row of pixel electrodes, and are respectively inputted with data signals by one of the two adjacent data lines. By that, the pixel electrodes that are inputted with data signals by the same data line are interleaved, and the polarity of any two adjacent pixel points is different, resulting in a good optical uniformity. Moreover, the polarity of signals output by each data line within one frame does not need to be changed, thus enabling reducing power consumption of LCD.

BRIEF DESCRIPTION OF THE DRAWINGS

To describe the technical solutions of embodiments of the present disclosure or the related art more clearly, a brief description is made to the figures to be used in the description of the embodiments or the related art in the following. According to the figures describing blow some of the embodiments of the disclosure, other figures can be derived from these figures without any creative work.

DESCRIPTION OF THE EMBODIMENTS

To make the object, technical solutions, and advantages of the embodiments of the disclosure more clear, a clear and complete description to the technical solutions of the embodiments of the disclosure is made in the following, in conjunction with the figures of the embodiments of the disclosure. Obviously, the embodiments described below are only a part of the embodiments of the disclosure, not all the embodiments. Based on the embodiments of the disclosure, other embodiments obtained by those skilled in the art without creative work will fall into the scope of the present disclosure.

Figure 3:
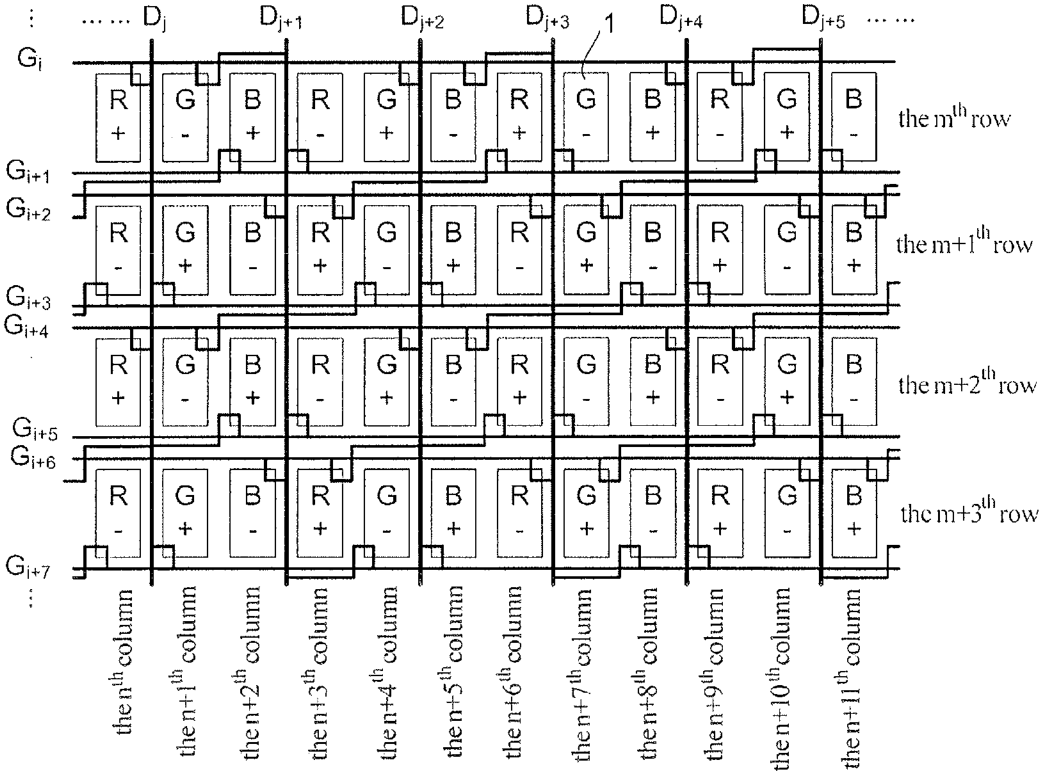
FIG. 3 shows a schematic diagram of a structure of a first embodiment of the LCD in the present disclosure.

FIG. 3 schematically shows a structure of a first embodiment of the LCD in the disclosure. The LCD includes an array substrate, on which there formed gate lines, data lines, and pixel electrodes 1. FIG. 3 shows a part of the array substrate, and the structure of the other part not shown is similar to that of the part shown. The gate lines shown in FIG. 3 are denoted with $G_i$, $G_{i+1}$, $G_{i+2}$, $G_{i+3}$, $G_{i+4}$, $G_{i+5}$, $G_{i+6}$, and $G_{i+7}$, respectively, and the data lines shown in FIG. 3 are denoted with $D_j$, $D_{j+1}$, $D_{j+2}$, $D_{j+3}$, $D_{j+4}$, and $D_{j+5}$, respectively. The pixel electrodes arranged in the vertical direction shown in FIG. 3 are referred to as the $n^{th}$ column of pixel electrodes (the pixel electrodes of column n), the $n+1^{th}$ column of pixel electrodes (the pixel electrodes of column n+1), the $n+2^{th}$ column of pixel electrodes (the pixel electrodes of column n+2), the $n+3^{th}$ column of pixel electrodes (the pixel electrodes of column n+3), the $n+4^{th}$ column of pixel electrodes (the pixel electrodes of column n+4), the $n+5^{th}$ column of pixel electrodes (the pixel electrodes of column n+5), the $n+6^{th}$ column of pixel electrodes (the pixel electrodes of column n+6), the $n+7^{th}$ column of pixel electrodes (the pixel electrodes of column n+7), the $n+8^{th}$ column of pixel electrodes (the pixel electrodes of column n+8), the $n+9^{th}$ column of pixel electrodes (the pixel electrodes of column n+9), the $n+10^{th}$ column of pixel electrodes (the pixel electrodes of column n+10), and the $n+11^{th}$ column of pixel electrodes (the pixel electrodes of column n+11), respectively.

In FIG. 3, odd lines of pixel electrodes in the same column are inputted with data signals by one of the data lines at the two sides of the column, and even lines of pixel electrodes are inputted with data signals by the other one of the data lines at the two sides of the column. Pixel electrodes in the same row are grouped into groups each with two pixel electrodes, and two pixel electrodes in one group are respectively controlled by one of the two gate lines at the two sides of the row alternately. The pixel electrodes controlled by each gate line are located in the same row. There are two gate lines between two adjacent rows of pixel electrodes. Two adjacent electrodes in the same row between two adjacent data lines are controlled respectively by one of the two gate lines at the two sides of the row of pixel electrodes, and respectively inputted with data signals by one of the two adjacent data lines.

For example, both the $n^{th}$ column of pixel electrodes and the $n+2^{th}$ column of pixel electrodes in the $m^{th}$ row are inputted with data signals by data line $D_{j+1}$, both the $n+1^{th}$ column of pixel electrodes the $n+3^{th}$ column of pixel electrodes in the $m^{th}$ row are inputted with data signals by data line $D_j$. For pixel electrodes in the row m, among the two electrodes between the data line $D_j$ and $D_{j+1}$, one is controlled by the gate line $G_i$, and the other is controlled by the gate line $G_{i+1}$. Among the two pixel electrodes between the data line $D_{j+1}$ and $D_{j+2}$, one is controlled by the gate line $G_{i+1}$, and the other is controlled by the gate line $G_i$.

In FIG. 3, among pixel electrodes in the same row, the two adjacent pixel electrodes at the two sides of the same data line are controlled by the same gate line. For example, among pixel electrodes in the row m, both two pixel electrodes at the two sides of the data line $D_j$ are controlled by the gate line $G_i$. Both two adjacent pixel electrodes at the two sides of the data line $D_{j+1}$ are controlled by the gate line $G_{i+1}$. Among pixel electrodes in the same row, the two adjacent pixel electrodes at the two sides of the same data line can also be controlled by one of the two gate lines at the two sides of the row of pixel electrodes, respectively.

Figure 4:
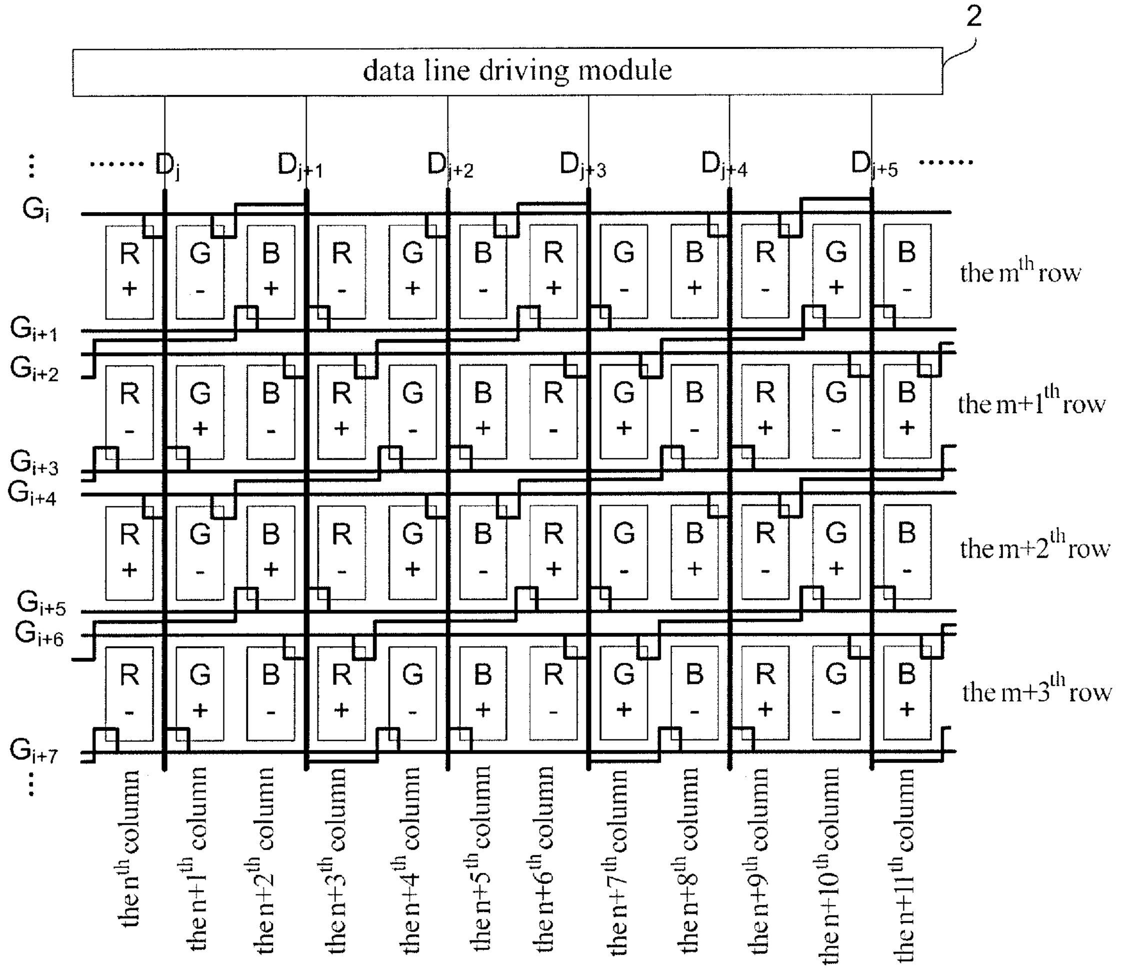
FIG. 4 shows a schematic diagram of a structure of a second embodiment of the LCD in the present disclosure.

FIG. 4 shows a structural schematic diagram of a second embodiment of the LCD of the present disclosure. A data line driving module 2 is added on the basis of the embodiment as shown in FIG. 3. The data line driving module 2 is respectively connected to each data line for inputting data signals with a first polarity into odd data lines, and inputting data signals with a second polarity into even data lines, during one frame; and inputting data signals with the second polarity into odd data lines, and inputting data signals with the first polarity into even data lines, during the next frame.

Figure 5:
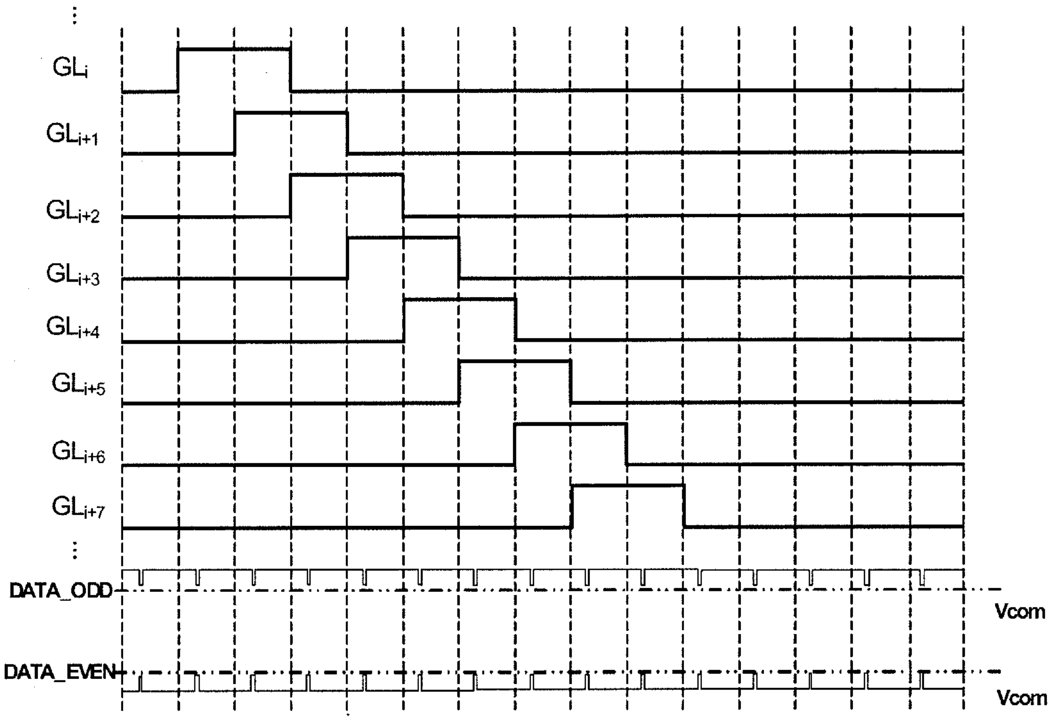
FIG. 5 shows a schematic diagram of the driving signals in frame x of the LCD in the present disclosure.
Figure 6:
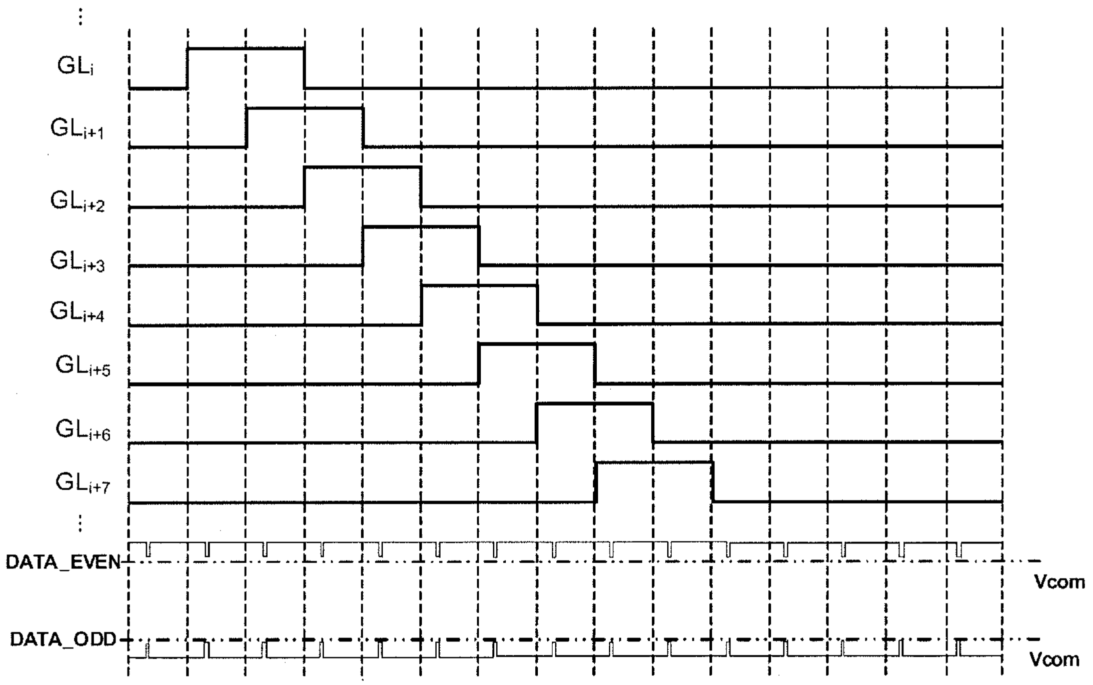
FIG. 6 shows a schematic diagram of the driving signals in frame x+1 of the LCD in the present disclosure.
Figure 7:
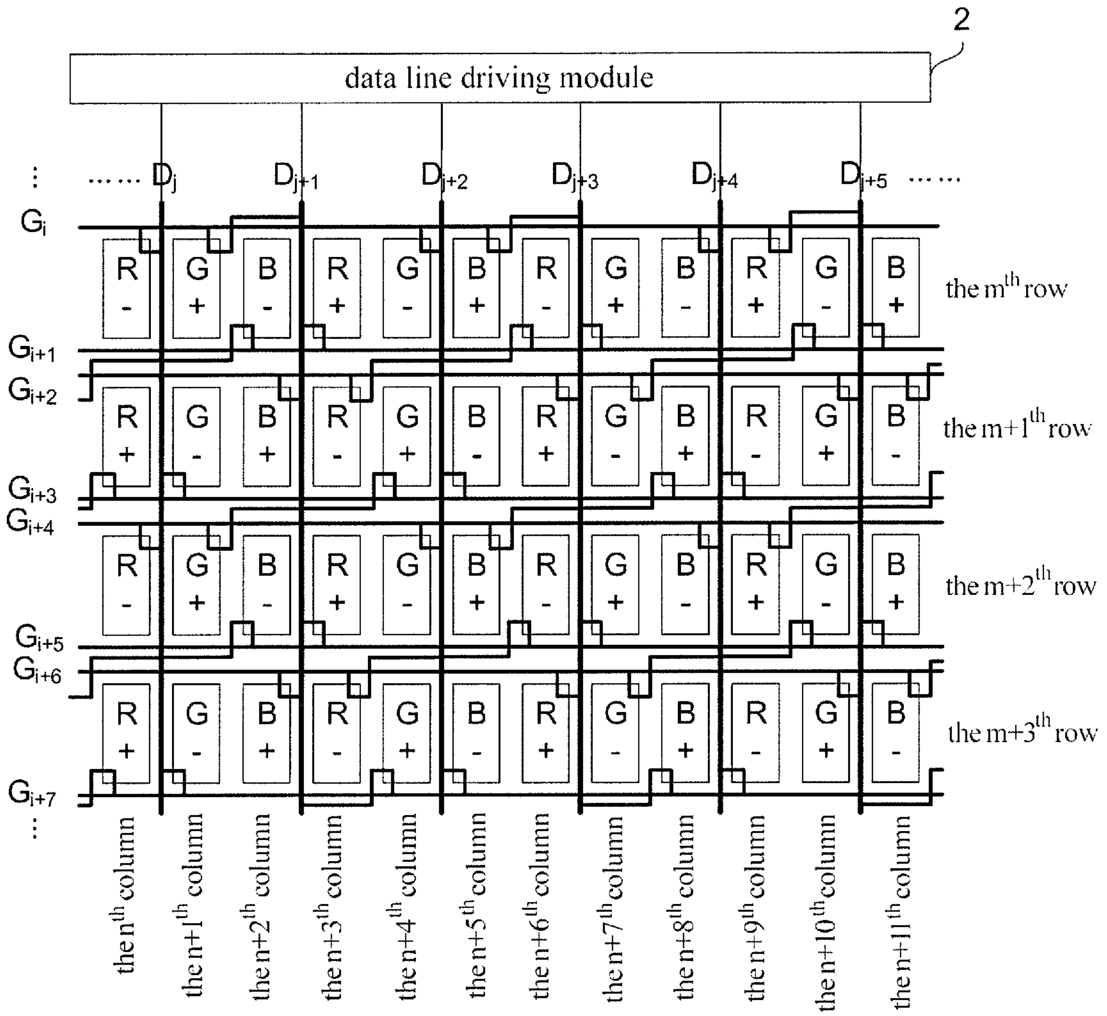
FIG. 7 shows a schematic diagram of the LCD shown in FIG. 4 with the polarity of each pixel electrode inverted.

FIG. 5 and FIG. 6 are schematic diagrams of driving signals in the frame x and frame x+1 of the LCD of the present disclosure, respectively, wherein x is a natural number, and FIG. 7 is a schematic diagram of the LCD shown in FIG. 4 with the polarity of each pixel electrode inverted. Signals output by each gate line in FIG. 5 and FIG. 6 are the same as that in FIG. 2, and signals inputted on the common electrode are the same as that in FIG. 2 as well. The signals DATA_ODD and DATA_EVEN are different from those in FIG. 2. the signals DATA_ODD and DATA_EVEN shown in FIG. 5 remain the same polarity in one frame, while the polarity of DATA_ODD and DATA_EVEN shown in FIG. 2 changes frequently in one frame. As compared FIG. 5 with FIG. 6, the polarity of signals DATA_ODD and DATA_EVEN is inverted, respectively.

Figure 1:
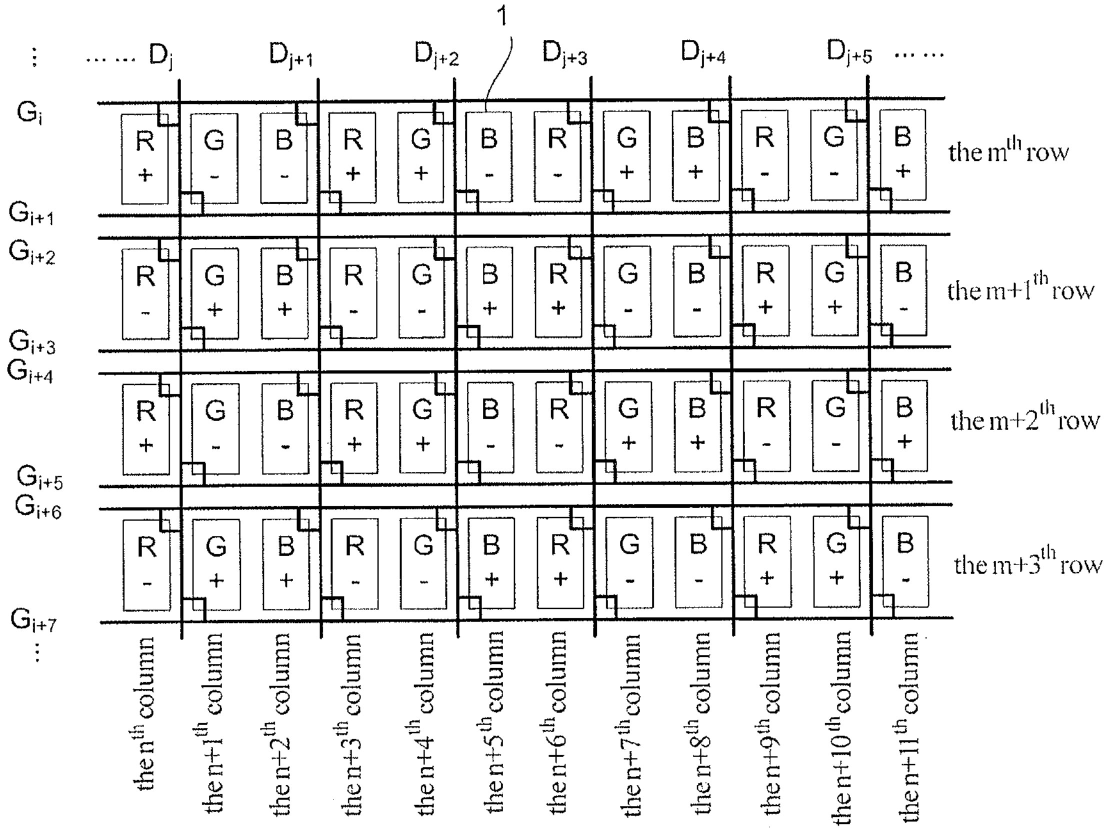
FIG. 1 (PRIOR ART)
FIG. 1 shows a schematic diagram of a structure of an array substrate of a LCD in the related art.
Figure 2:
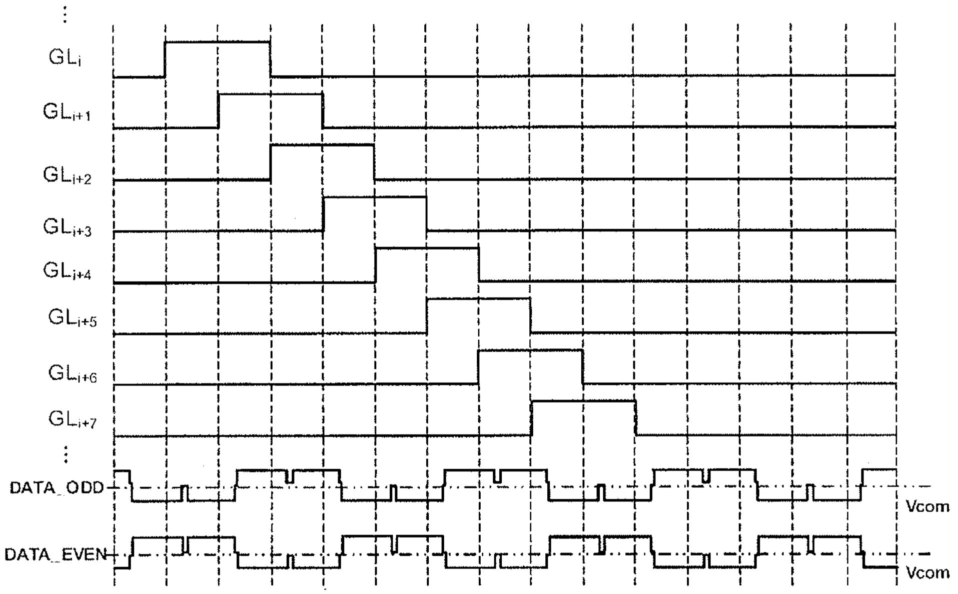
FIG. 2 (PRIOR ART)
FIG. 2 shows a schematic diagram of the driving signals of the array substrate shown in FIG. 1.

The difference between FIG. 5, FIG. 6 and FIG. 2 results from the difference between the structures of the LCD array substrates shown in FIG. 1 and FIG. 4. The operating principle of the LCD in the present disclosure is explained in the following by an example of two adjacent frames, in conjunction with FIGS. 4, 5, 6, and 7. It should be noted that because FIG. 5 shows only a part of the LCD, and similar structures of other parts are not shown, the following explanation of principle is mainly for the part shown, and the principle of parts not shown is similar with the part shown.

(1) Frame x (see FIG. 4 and FIG. 5)

When gate line $G_i$ is turned on (for example, a high level is output by $G_i$), the data signals are inputted on the pixel electrodes of column n, column n+1, column n+4, column n+5, column n+8, and column n+9 in the row m, wherein the polarity of data signals on the pixel electrodes of column n, column n+4, and column n+8 is "+", while the polarity of data signals on the pixel electrodes of column n+1, column n+5, and column n+9 is "−". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−". When gate line $G_{i+1}$ outputs a high level, the data signals are inputted on the pixel electrodes of column n+2, column n+3, column n+6, column n+7, column n+10, and column n+11 in the row m, wherein the polarity of data signals on the pixel electrodes of column n+2, column n+6, and column n+10 is "+", while the polarity of data signals on the pixel electrodes of column n+3, column n+7, and column n+11 is "−". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+2}$ outputs a high level, the data signals are inputted on the pixel electrodes of column n+2, column n+3, column n+6, column n+7, column n+10, and column n+11 in the row m+1, wherein the polarity of data signals on the pixel electrodes of column n+2, column n+6, and column n+10 is "−", while the polarity of data signals on the pixel electrodes of column n+3, column n+7, and column n+11 is "+". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+3}$ outputs a high level, the data signals are inputted on the pixel electrodes of column n, column n+1, column n+4, column n+5, column n+8, and column n+9 in the row m+1, wherein the polarity of data signals on the pixel electrodes of column n, column n+4, and column n+8 is "−", while the polarity of data signals on the pixel electrodes of column n+1, column n+5, and column n+9 is "+". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+4}$ outputs a high level, the data signals are inputted on the pixel electrodes of column n, column n+1, column n+4, column n+5, column n+8, and column n+9 in the row m+2, wherein the polarity of data signals on the pixel electrodes of column n, column n+4, and column n+8 is "+", while the polarity of data signals on the pixel electrodes of column n+1, column n+5, and column n+9 is "−". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+5}$ outputs a high level, the data signals are inputted on the pixel electrodes of column n+2, column n+3, column n+6, column n+7, column n+10, and column n+11 in the row m+2, wherein the polarity of data signals on the pixel electrodes of column n+2, column n+6, and column n+10 is "+", while the polarity of data signals on the pixel electrodes of column n+3, column n+7, and column n+11 is "−". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+6}$ outputs a high level, the data signals are inputted on the pixel electrodes of column n+2, column n+3, column n+6, column n+7, column n+10, and column n+11 in the row m+3, wherein the polarity of data signals on the pixel electrodes of column n+2, column n+6, and column n+10 is "−", while the polarity of data signals on the pixel electrodes of column n+3, column n+7, and column n+11 is "+". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

When gate line $G_{i+7}$ outputs a high level, the data signals are inputted on the pixel electrodes of column n, column n+1, column n+4, column n+5, column n+8, and column n+9 in the row m+3, wherein the polarity of data signals on the pixel electrodes of column n, column n+4, and column n+8 is "−", while the polarity of data signals on the pixel electrodes of column n+1, column n+5, and column n+9 is "+". Accordingly, the polarity of data signals output by data lines $D_j$, $D_{j+2}$, $D_{j+4}$ is "+", and the polarity of data signals output by data lines $D_{j+1}$, $D_{j+3}$, $D_{j+5}$ is "−".

In the frame x (the $x^{th}$ frame), the polarity of each data line does not change, while in the frame x+1, the polarity of each data line changes, so that the polarity of each pixel electrode is inverted.

(2) Frame x+1 (see FIG. 6 and FIG. 7)

When gate line $G_i$ outputs a high level, the data signals are inputted on the pixel electrodes of column n, column n+1, column n+4, column n+5, column n+8, and column n+9 in the row m, wherein the polarity of data signals on the pixel electrodes of column n, column n+4, and column n+8 is "−", while the polarity of data signals on the pixel electrodes of column n+1, column n+5, and column n+9 is "+". Accordingly, the polarity of data signals output by data lines $D_j$, $D_{j+2}$, $D_{j+4}$ is "−", and the polarity of data signals output by data lines $D_{j+1}$, $D_{j+3}$, $D_{j+5}$ is "+".

When gate line $G_{i+1}$ outputs a high level, the data signals are inputted on the pixel electrodes of column n+2, column n+3, column n+6, column n+7, column n+10, and column n+11 in the row m, wherein the polarity of data signals on the pixel electrodes of column n+2, column n+6, and column n+10 is "−", while the polarity of data signals on the pixel electrodes of column n+3, column n+7, and column n+11 is "+". Accordingly, the polarity of data signals output by data lines $D_j$, $D_{j+2}$, $D_{j+4}$ is "−", and the polarity of data signals output by data lines $D_{j+1}$, $D_{j+3}$, $D_{j+5}$ is "+".

When gate line $G_{i+2}$ outputs a high level, the data signals are inputted on the pixel electrodes of column n+2, column n+3, column n+6, column n+7, column n+10, and column n+11 in the row m+1, wherein the polarity of data signals on the pixel electrodes of column n+2, column n+6, and column n+10 is "+", while the polarity of data signals on the pixel electrodes of column n+3, column n+7, and column n+11 is "−". Accordingly, the polarity of data signals output by data lines $D_j$, $D_{j+2}$, $D_{j+4}$ is "−", and the polarity of data signals output by data lines $D_{j+1}$, $D_{j+3}$, $D_{j+5}$ is "+".

When gate line $G_{i+3}$ outputs a high level, the data signals are inputted on the pixel electrodes of column n, column n+1, column n+4, column n+5, column n+8, and column n+9 in the row m+1, wherein the polarity of data signals on the pixel electrodes of column n, column n+4, and column n+8 is "+", while the polarity of data signals on the pixel electrodes of column n+1, column n+5, and column n+9 is "–". Accordingly, the polarity of data signals output by data lines $D_j$, $D_{j+2}$, $D_{j+4}$ is "–", and the polarity of data signals output by data lines $D_{j+1}$, $D_{j+3}$, $D_{j+5}$ is "+".

When gate line $G_{i+4}$ outputs a high level, the data signals are inputted on the pixel electrodes of column n, column n+1, column n+4, column n+5, column n+8, and column n+9 in the row m+2, wherein the polarity of data signals on the pixel electrodes of column n, column n+4, and column n+8 is "–", while the polarity of data signals on the pixel electrodes of column n+1, column n+5, and column n+9 is "+". Accordingly, the polarity of data signals output by data lines $D_j$, $D_{j+2}$, $D_{j+4}$ is "–", and the polarity of data signals output by data lines $D_{j+1}$, $D_{j+3}$, $D_{j+5}$ is "+".

When gate line $G_{i+5}$ outputs a high level, the data signals are inputted on the pixel electrodes of column n+2, column n+3, column n+6, column n+7, column n+10, and column n+11 in the row m+2, wherein the polarity of data signals on the pixel electrodes of column n+2, column n+6, and column n+10 is "–", while the polarity of data signals on the pixel electrodes of column n+3, column n+7, and column n+11 is "+". Accordingly, the polarity of data signals output by data lines $D_j$, $D_{j+2}$, $D_{j+4}$ is "–", and the polarity of data signals output by data lines $D_{j+1}$, $D_{j+3}$, $D_{j+5}$ is "+".

When gate line $G_{i+6}$ outputs a high level, the data signals are inputted on the pixel electrodes of column n+2, column n+3, column n+6, column n+7, column n+10, and column n+11 in the row m+3, wherein the polarity of data signals on the pixel electrodes of column n+2, column n+6, and column n+10 is "+", while the polarity of data signals on the pixel electrodes of column n+3, column n+7, and column n+11 is "–". Accordingly, the polarity of data signals output by data lines $D_j$, $D_{j+2}$, $D_{j+4}$ is "–", and the polarity of data signals output by data lines $D_{j+1}$, $D_{j+3}$, $D_{j+5}$ is "+".

When gate line $G_{i+7}$ outputs a high level, the data signals are inputted on the pixel electrodes of column n, column n+1, column n+4, column n+5, column n+8, and column n+9 in the row m+3, wherein the polarity of data signals on the pixel electrodes of column n, column n+4, and column n+8 is "+", while the polarity of data signals on the pixel electrodes of column n+1, column n+5, and column n+9 is "–". Accordingly, the polarity of data signals output by data lines $D_j$, $D_{j+2}$, $D_{j+4}$ is "–", and the polarity of data signals output by data lines $D_{j+1}$, $D_{j+3}$, $D_{j+5}$ is "+".

As compared with LCD in the prior art, in the LCD presented in each embodiment of the present disclosure, odd rows of pixel electrodes in the same column are inputted with data signals by one of the data lines at the two sides of the column, and even rows of pixel electrodes in the same column are inputted with data signals by the other one of the data lines at the two sides of the column. Furthermore, two adjacent pixel electrodes in the same row between two adjacent data lines are respectively controlled by one of the two gate lines at the two sides of the row of pixel electrodes, and they are respectively inputted with data signals by one of the two adjacent data lines. By that, the pixel electrodes that are inputted with data signals by the same data line are interleaved, and the polarity of any two adjacent pixel points is different, resulting in a good optical uniformity. Moreover, the polarity of the signals output by each data line within one frame does not need to be changed frequently, enabling reducing power consumption of the LCD. Further, in the whole picture, the pixel electrodes with different luminance are interleaved to make the display effect of the whole picture more uniform, and avoid phenomena such as flickering.

Figure 8:
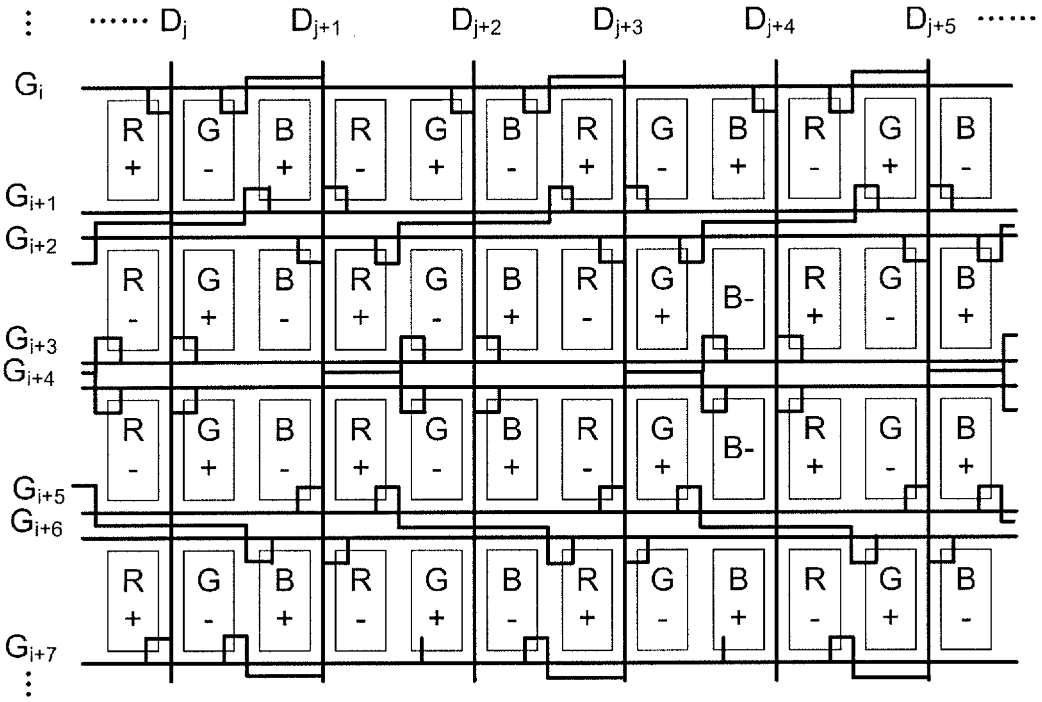
FIG. 8 shows a schematic diagram of a structure of a third embodiment of the LCD in the present disclosure.

FIG. 8 is a structural schematic diagram of a third embodiment of the LCD of the present disclosure. The LCD is configured such that among the pixel electrodes in the same column, two adjacent pixel electrodes are grouped into one group, the pixel electrodes in the odd groups are inputted with data signals by one of the data lines at two sides of the column of pixel electrodes, and the pixel electrodes in the even groups are inputted with data signals by the other one of the data lines at two sides of the column of pixel electrodes; the pixel electrodes in the same row are respectively controlled by one of the two gate lines at the two sides of the row of pixel electrodes, and the pixel electrodes controlled by each gate line are located in the same row; there are two gate lines between two adjacent rows of pixel electrodes; two adjacent pixel electrodes in the same row between two adjacent data lines are respectively controlled by one of the two gate lines at the two sides of the row of pixel electrodes, and they are respectively inputted with data signals by one of the two adjacent data lines.

The third embodiment differs from the first embodiment in that in the third embodiment, among the pixel electrodes in the same column, two adjacent pixel electrodes are grouped into one group, and the two pixel electrodes in each group are inputted with data signals by the same data line; in the first embodiment, among the pixel electrodes in the same column, any two adjacent pixel electrodes are inputted with data signals by different data lines.

In the embodiment shown in FIG. 8, among the pixel electrodes in the same row, the polarity of any two adjacent pixel electrodes is different; among the pixel electrodes in the same column, the two pixel electrodes belonging to the same group and being inputted with data signals by the same data line have the same polarity, and the pixels electrodes in any two adjacent groups have different polarities.

In the structure shown in FIG. 8, the optical uniformity is a little worse than the previous embodiment, however, such a structure can also ensure the polarity of each data line remains unchanged within one frame when being driven, which can achieve a goal of reducing power consumption.

For the embodiment shown in FIG. 8, among the pixel electrodes in the same row, the two adjacent pixel electrodes at the two sides of the same data line can also be controlled by one of the two gate lines at the two sides of the row of pixel electrodes, respectively.

The LCD shown in FIG. 8 can also include a data line driving module 2 as shown in FIG. 4, and the driving mode of the data line driving module is substantially the same as that in the previous embodiments.

Finally, it should be noted that the above-mentioned embodiments are only for illustrating the technical solutions of the present disclosure, but not intended to limit the disclosure. Although the disclosure has been described in detail with reference to the above-mentioned embodiments, those skilled in the art should understand that the technical solutions recorded in the above-mentioned embodiments can be modified, or a part of their technical features can be replaced by equivalents thereof, and the modifications and replacements do not depart from the spirit and scope of the technical solution of each embodiment of the disclosure.

What is claimed is:

1. A liquid crystal display comprising an array substrate, wherein gate lines, data lines and pixel electrodes formed on the array substrate;

all of odd rows of pixel electrodes in a column being inputted with data signals by one of the data lines at the two sides of the column, and all of even rows of pixel electrodes in the column being inputted with data signals by the other one of the data lines at the two sides of the column;

the pixel electrodes in a same row being respectively controlled by one of the two gate lines at the two sides of the row of pixel electrodes, the pixel electrodes controlled by each gate line located in the same row, there being two gate lines between two adjacent rows of pixel electrodes;

two adjacent pixel electrodes in the same row between two adjacent data lines being respectively controlled by one of the two gate lines at the two sides of the row of pixel electrodes, and being respectively inputted with data signals by one of the two adjacent data lines.

2. The liquid crystal display according to claim 1, wherein among the pixel electrodes in the same row, two adjacent pixel electrodes at the two sides of the same data line are controlled by the same gate line.

3. The liquid crystal display according to claim 1, further comprising a data line driving module, which is connected with respective data lines respectively, for inputting the data signals with a first polarity into odd data lines, and inputting the data signals with a second polarity into even data lines during one frame, and inputting the data signals with the second polarity into odd data lines, and inputting the data signals with the first polarity into even data lines during the next frame.

4. A liquid crystal display comprising an array substrate, wherein gate lines, data lines and pixel electrodes formed on the array substrate;

among the pixel electrodes in a column, two adjacent pixel electrodes being grouped into one group, all the pixel electrodes in the odd groups in the column being inputted with data signals by one of the data lines at two sides of the column of pixel electrodes, and all the pixel electrodes in the even groups in the column being inputted with data signals by the other one of the data lines at two sides of the column of pixel electrodes;

the pixel electrodes in a same row being respectively controlled by one of the two gate lines at the two sides of the row of pixel electrodes, the pixel electrodes controlled by each gate line located in the same row, and there being two gate lines between two adjacent rows of pixel electrodes;

two adjacent pixel electrodes in the same row between two adjacent data lines being respectively controlled by one of the two gate lines at the two sides of the row of pixel electrodes, and being respectively inputted with data signals by one of the two adjacent data lines.

5. The liquid crystal display according to claim 4, wherein among the pixel electrodes in the same row, two adjacent pixel electrodes at the two sides of the same data line are controlled by the same gate line.

6. The liquid crystal display according to claim 4, further comprising a data line driving module, which is connected with respective data lines respectively, for inputting the data signals with a first polarity into odd data lines, and inputting the data signals with a second polarity into even data lines during one frame; and inputting the data signals with the second polarity into odd data lines, and inputting the data signals with the first polarity into even data lines during the next frame.

7. The liquid crystal display according to claim 5, further comprising a data line driving module, which is connected with respective data lines respectively, for inputting the data signals with a first polarity into odd data lines, and inputting the data signals with a second polarity into even data lines during one frame; and inputting the data signals with the second polarity into odd data lines, and inputting the data signals with the first polarity into even data lines during the next frame.

* * * * *